United States Patent [19]

Matsuo

[11] Patent Number: 4,677,687
[45] Date of Patent: Jun. 30, 1987

[54] METHOD OF ESTABLISHING COMMUNICATION RELAY BETWEEN MOBILE UNIT AND LAND SITE AND BOOSTER USED THEREFOR

[75] Inventor: Yoshitake Matsuo, Tokyo, Japan

[73] Assignee: NEC Corporation, Tokyo, Japan

[21] Appl. No.: 747,492

[22] Filed: Jun. 21, 1985

[30] Foreign Application Priority Data

Jun. 22, 1984 [JP] Japan ................................. 59-127312

[51] Int. Cl.$^4$ ............................................. H04B 17/02
[52] U.S. Cl. ......................................... 455/10; 455/33; 455/54
[58] Field of Search ........................ 455/8–11, 455/17, 33, 34, 54, 56; 179/2 EB

[56] References Cited

U.S. PATENT DOCUMENTS

| | | | |
|---|---|---|---|
| 3,035,169 | 5/1962 | Griffith ................................. | 455/10 |
| 4,144,412 | 3/1979 | Ito et al. ............................... | 455/33 |
| 4,481,670 | 11/1984 | Freeburg ............................. | 455/33 |

Primary Examiner—Jin F. Ng
Attorney, Agent, or Firm—Sughrue, Mion, Zinn, Macpeak and Seas

[57] ABSTRACT

In order to either permit communication to continue or to permit a call to be placed while a mobile unit is located in a zone of weak signal strength such as a tunnel or underground parking, a booster is disposed in the zone and arranged to establish communication with the mobile unit over a booster channel. When the mobile unit detects the signal strength being below a level at which communication is possible, the unit switches to the booster channel and establishes temporary communication with the booster. This enables the booster to be conditioned to establish a communication link between the land site and the mobile unit over a voice channel. The mobile unit is responsive to the conditioning of the booster to switch to the voice channel. Hence the need for wholesale relaying of all channels is obviated by the selective relaying which is possible via the provision of the booster channel.

3 Claims, 5 Drawing Figures

CONTROL CHANNELS  BOOSTER CHANNEL(S)  VOICE CHANNELS

METHOD OF ESTABLISHING COMMUNICATION RELAY BETWEEN MOBILE UNIT AND LAND SITE AND BOOSTER USED THEREFOR

BACKGROUND OF THE INVENTION

1. Field of The Invention

This invention relates to a method of relaying mobile-radio signals which ensures the communication link between a mobile unit(s) and a land site when the mobile unit(s) enters and/or is located in a zone in which communication is not normally possible due to weak signal strength, and also relates to a booster used therefor.

2. Description of the Prior Art

Unlike the microwave communications between fixed stations at high elevation, commercial mobile communication services have encountered a problem that because of weak signal strength, communication tends to be blocked in zones such as underground parking lots, tunnels, in the shadows of large buildings, etc.

At the inception of mobile communication services, it was difficult to eliminate the problem due to high costs and unmatured techniques. However, with the increasing number of subscribers the demand for a solution to this problem has increased markedly. In this specification, by definition, the term "zone of weak signal strength" or "weak signal strength zone" describes a zone in which electromagnetic field strength is not strong enough to enable direct mobile-radio communication between the mobile unit and the land site and hence signal boosting is necessary.

One known approach to solving the problem is to provide a relay station at each zone of weak signal strength to amplify all the channels allocated to a coverage area. This approach however, has encountered the difficulty that intermodulation interferences occur when simultaneously amplifying the large number of communication waves such that all the channel signals can not be linearly amplified. Additionally, such a relay station is bulky and complicated with the attendant disadvantage of high manufacturing costs.

Another known approach is to provide the same equipment as a land site in each zone of weak signal strength. However, since the number of mobile units concurrently in use in a single zone is very small, providing such equipment is relatively expensive and thus impractical from an economical viewpoint.

SUMMARY OF THE INVENTION

It is a primary object of this invention to provide a method of ensuring mobile communication between a land site and a mobile unit(s) which enters and/or is located in a zone of weak signal strength.

Another object of this invention is to provide a method of using a booster channel, allocated to a zone of weak signal strength, to detect a mobile unit which requests communication with a land site while located in the zone to establish a communication link between the mobile unit and the land site.

Another object of this invention is to provide a booster used for the above-mentioned purposes, which booster is simple and can be used to relay mobile communication between a land site and a mobile unit(s) located in a zone of weak signal strength.

These objects are fulfilled by providing a booster which is disposed in the zone of weak signal strength and arranged to establish communication with the mobile unit over a booster channel. When the mobile unit detects the signal strength being below a level at which communication is possible, the unit switches to the booster channel and establishes temporary communication with the booster. This enables the booster to be conditioned to establish a communication link between the land site and the mobile unit over a voice channel. The mobile unit is responsive to the conditioning of the booster to switch to the voice channel. Hence the need for wholesale relaying of all channels is obviated by the selective relaying which is possible via the provision of the booster channel.

One aspect of this invention takes the form of a method of permitting communication between the mobile unit and the land site when the mobile unit is located in a zone of weak signal strength wherein direct communication between the land site and the mobile unit cannot occur, comprising the steps of: arranging a booster in the zone; arranging the mobile unit to be responsive to weak signal strength below a predetermined level in a manner to switch to a booster channel; establishing communication between the mobile unit and the booster over the booster channel to acquire control data from the mobile unit; conditioning, in the event that the mobile unit places a call in the zone, the booster to inform the land site of the transmission requirement of the mobile unit over a control channel; inducing the booster to establish communication between the land site and the mobile unit over a voice channel which may be used even after the mobile unit has left the zone; and switching communication between the booster and the mobile unit from the booster channel to the voice channel to establish a communication relay between the mobile unit and the land site.

BRIEF DESCRIPTION OF THE DRAWINGS

The features and advantages of the present invention will become more clearly appreciated from the following description taken in conjunction with the accompanying drawings.

DETAILED DESCRIPTION OF THE PREFERRED EMBODIMENTS

Figure 1:
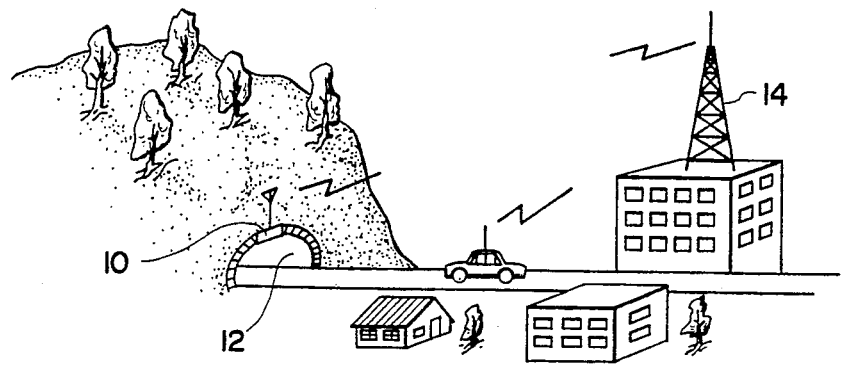
FIG. 1 is a sketch showing an example of a zone of weak signal strength (tunnel) located within a coverage area of a land site.

Reference is now made to FIG. 1, wherein there is shown a sketch in which a booster 10, according to this invention, is provided at an appropriate location near the entrance of a tunnel 12 in order to boost mobile-radio signals between a land site 14 and a mobile unit within the tunnel 12.

Figure 2:
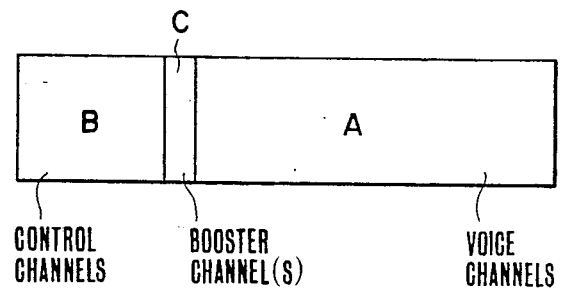
FIG. 2 is a chart showing a channel format which includes a booster channel(s) used in this invention.

FIG. 2 is a chart showing a channel format in which "A" denotes a plurality of voice channels, "B" a plurality of data or control channels, and "C" a booster channel(s) provided in accordance with this invention.

The present-day mobile-telephone services adopt, for example, an SCPC (Single Channel Per Carrier) system in which multiple channels are spaced 25 kHz apart in 2×15 MHz bandwidths located at the range of 900 MHz. In order to meet the objectives of a large-scale mobile-telephone service, a so-called "cellular system" is used which increases the traffic capacity within existing allocated regions of the radio spectrum through the reuse of assigned frequency channels.

An important feature of this invention is that the provision of the booster channel(s) does not affect the spectrum efficiency of the overall system in that the number of mobile units simultaneously in use in a single zone of weak signal strength is very small. In practice, at least one booster channel can meet the requirements for transmission to and from mobile units in each zone of weak signal strength. It will be understood that since each zone of weak signal strength is isolated from the other, using the same booster channel in all the zones does not invite any interference.

The booster according to this invention may be deemed as a mobile unit from the side of a land site, while deemed as a land site from the side of a mobile unit.

Figure 3:
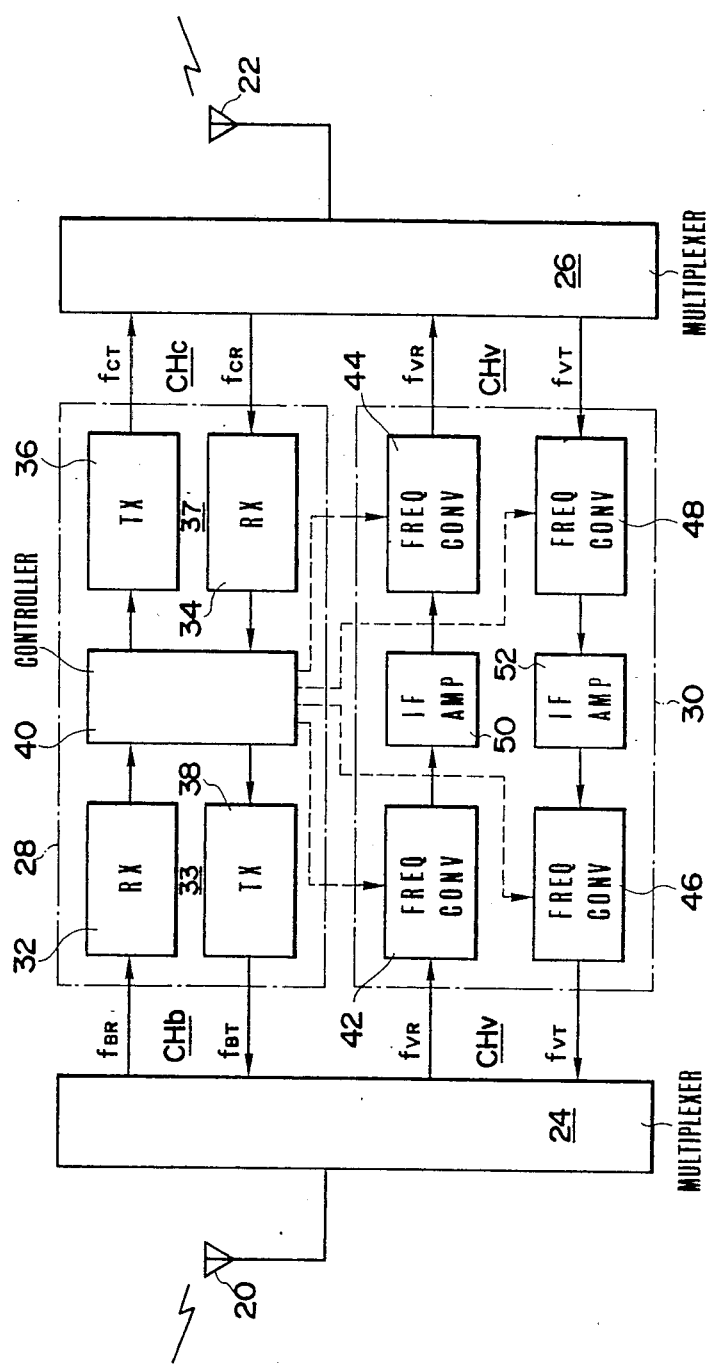
FIG. 3 is a block diagram showing a booster according to this invention.

FIG. 3 is a block diagram showing a booster according to this invention, which may be installed at a convenient location of a zone of weak signal strength in order to relay mobile-radio signals when a mobile unit is located in such a zone.

As shown in FIG. 3, the booster comprises an antenna 20 directed to the mobile unit(s) in a weak signal strength zone (not shown) and another antenna 22 for communication with the land site 14 (FIG. 1). The antennas 20, 22 are respectively coupled to multiplexers 24, 26. Between these multiplexers 24 and 26 are a control section 28 and a relay means (or relay channel section) 30.

The control section 28 comprises two transceivers 33 and 37, and a controller 40. The transceiver 33 consists of a receiver 32 and a transmitter 38 to communicate with a mobile unit over a booster channel CHb (carrier frequencies $f_{BR}$ and $f_{BT}$), while the other transceiver 37 consists of a receiver 34 and a transmitter 36 to communicate with the land site over a control channel CHc (carrier frequencies $f_{CR}$ and $f_{CT}$). On the other hand, the relay means 30 is provided with two IF amplifiers 50, 52, and four frequency converters 42, 44, 46 and 48, which provides a voice channel CHv (carrier frequencies $f_{VR}$ and $f_{VT}$) and which are controlled by the controller 40 with respect to tuning.

For the sake of simplicity, the FIG. 3 arrangement is provided with one voice channel CHv and one booster channel CHb. However, more than two voice channels can be provided to meet the requirement arising from increasing mobile units simultaneously in use in a single zone. Further, this invention is not limited to the use of one booster channel. However, the assignment of one booster channel to one region is empirically sufficient.

The operation of the booster shown in FIG. 3 will be described with reference to FIGS. 4 and 5.

Figure 4:
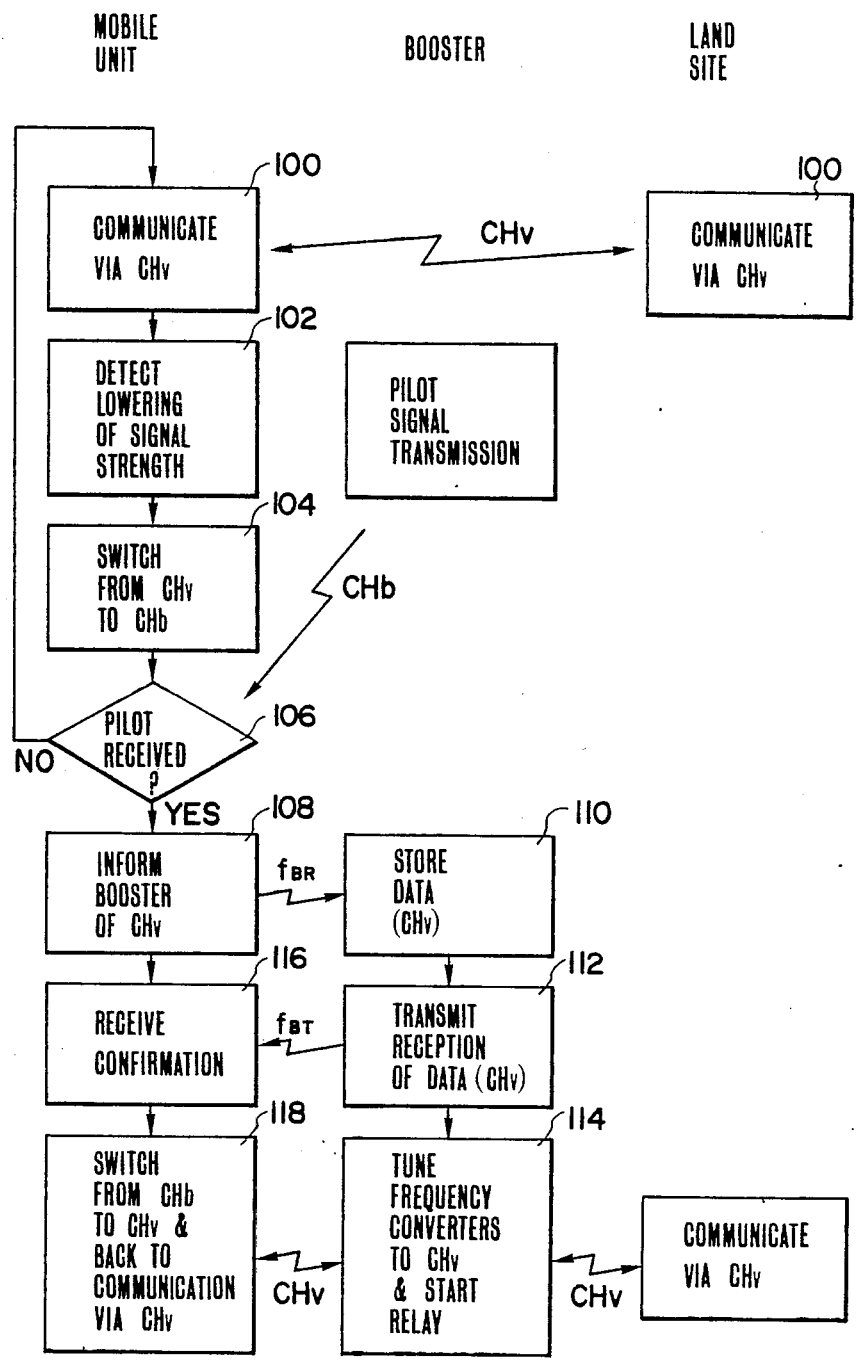
FIG. 4 is a flow chart for explaining the method according to this invention in the case where a mobile unit enters a zone of weak signal strength while communicating with a land site.

The flow chart of FIG. 4 shows the case where a mobile unit enters a weak signal strength zone from open space while communicating with the land site via the voice channel CHv which has been assigned by the land site. On the other hand, the flow chart of FIG. 5 relates to the case where a mobile unit places a telephone call while located in the zone of weak signal strength.

In FIG. 4, as mentioned above, assuming that the mobile unit has communicated over the channel CHv with the land site while in the open zone (step 100) and then enters the zone, when the mobile unit detects that the signal strength is below a predetermined level (step 102), the unit is automatically switched over or tuned from the channel CHv to the channel CHb (step 104). The mobile unit checks the reception of a pilot signal transmitted over the channel CHb from the booster (step 106). The booster emits the pilot signal if ready to accept next boosting. If the mobile unit receives the pilot signal, then the unit supplies the booster with the data over channel CHv (step 108). Otherwise, the flow returns to step 100.

When the mobile unit transmits the data over channel CHv, the booster receives it at the receiver 32 which demodulates the received radio signal into the corresponding baseband signal. The controller 40 is supplied with the baseband signal and stores it in a memory provided therein (step 110). Further, the controller 40 advises, via the transmitter 38, the mobile unit of the reception of the data (CHv) (step 112) and simultaneously tunes the frequency converters 42, 44, 46 and 48 to the channel CHv (step 114). When the mobile unit receives the confirmation signal indicating that the booster has already received the channel data (CHv) (step 116), the unit is tuned from the channel CHb to CHv (step 118). Thus, the mobile unit is again able to communicate with the land site over the previously allocated channel CHv. When the mobile unit moves out of the zone, the unit is also capable of continuing the communication over the same channel CHv.

Figure 5:
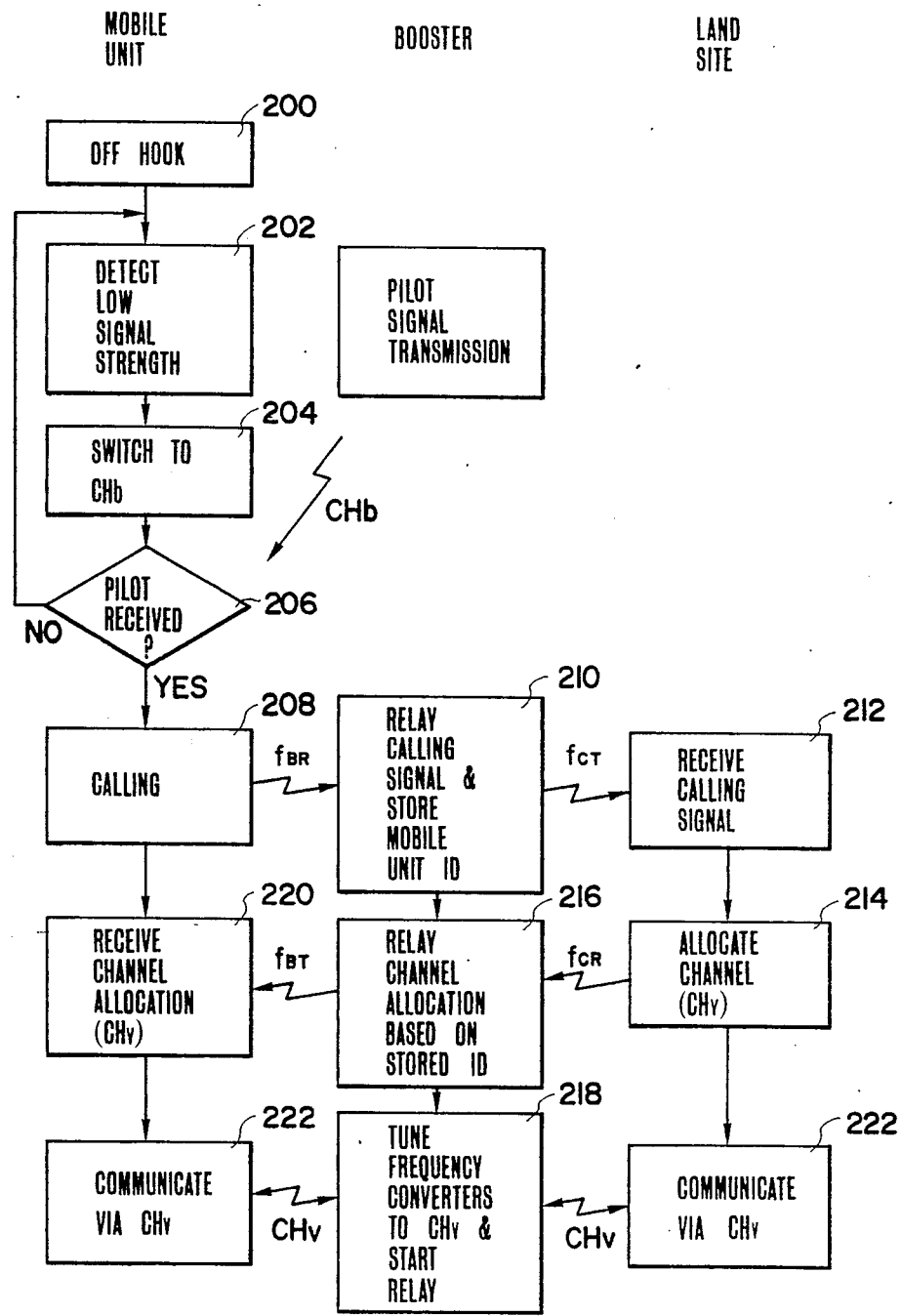
FIG. 5 is a flow chart for describing the method according to this invention in the case where a mobile unit places a call while in a zone of weak signal strength.

Turning now to FIG. 5, when the mobile unit is energized by going off hook to place a call while in the zone of weak signal strength (step 200), the unit detects the signal strength below the predetermined level (step 202). In response to the detection the mobile unit is automatically tuned to the channel CHb (step 204). Thereafter the mobile unit checks reception of the pilot signal (step 206) similar to the above case. If the pilot signal is received, the mobile unit initiates a call at step 208. Otherwise, the flow returns to step 202.

When the mobile unit places a call, the booster receives the calling signal over the channel CHb and relays it to the land site through the controller 40, the transmitter 36, the multiplexer 26, and the antenna 22 by using the carrier frequency $f_{CT}$ of the control channel CHc (step 210). During this process, the controller 40 stores the mobile unit identification data contained in the calling signal. The land site receives the calling signal relayed from the booster (step 212), and allocates a channel (assuming CHv in this case) at step 214. Thereafter, the land site transmits the allocated channel CHv to the booster using the carrier frequency $f_{CR}$ of the channel CHc. The booster then relays the data of the allocated channel CHv to the mobile unit in which the booster specifies the mobile unit according to the already stored unit identification data (step 216). During this process the booster tunes the frequency converters 42, 44, 46 and 48 to the assigned channel CHv (step 218). On the other hand, the mobile unit responds to the relayed signal and switches from channel CHb to the channel CHv at step 220. Thus, the mobile unit is able to communicate with the land site via the booster over the channel CHv (step 222). When the mobile unit moves out of the zone, the unit is also capable of continuing the communication over the same channel CHv.

The foregoing description shows only preferred embodiments of the present invention. Various modifications are apparent to those skilled in the art without departing from the scope of this invention which is only limited by the appended claims.

What is claimed is:

1. In a communication system including a mobile unit and a land site, a method of permitting communication between said mobile unit and said land site via a booster when said mobile unit is located in a zone of weak signal strength wherein direct communication between said land site and said mobile unit cannot occur, comprising the steps of:

disposing a booster in said zone;

detecting, at said mobile unit, a weak signal strength below a predetermined level; switching, at said mobile unit, to a booster channel to establish communication between said mobile unit and said booster over said booster channel;

transmitting control data from said mobile unit to said booster;

transmitting, in response to said mobile unit requesting a call in said zone, a signal from said booster to said land site over a control channel to inform said land site of the call request to said mobile unit;

controlling said booster to establish communication between said land site and said mobile unit over a voice channel which may be used after the mobile unit has left said zone; and switching communication between said booster and said mobile unit from said booster channel to said voice channel to establish a communication relay between said mobile unit and said land site.

2. In a communication system including a mobile unit and a land site, a method of permitting communication between said mobile unit and said land site when said mobile unit is located in a zone of weak signal strength wherein direct communication between said land site and said mobile unit cannot occur, said method comprising the steps of:

(a) in the event that a mobile unit has established communication with said land site over a voice channel and enters said zone, detecting the signal strength of said voice channel received by said mobile unit being below a predetermined level;

switching said mobile unit from said voice channel to a booster channel;

transmitting data of said voice channel from said mobile unit to said booster over said booster channel;

tuning said booster to said voice channel in accordance with said data; and switching said mobile unit back to said voice channel; and (b) in the event that the mobile unit is in a zone of weak signal strength and requires a calling to be placed in said zone, the steps of:

detecting low signal strength by said mobile unit;

switching said mobile unit to communicate over said booster channel with said booster;

transmitting a calling signal to said booster over said booster channel wherein said booster stores therein data for identifying said mobile unit;

transmitting the calling signal from said booster to said land site over a control channel;

receiving at said booster data of the voice channel allocated by said land site over said control channel;

controlling said booster to establish communication relay between said mobile unit and said land site over said voice channel; and informing said mobile unit of the data of said allocated voice channel to switch said mobile unit to same.

3. A booster for use in a mobile communication system to establish communication between a mobile unit and a land site when said mobile unit enters or is located in a zone of weak signal strength wherein direct communication between said land site and said mobile unit cannot occur, said mobile unit switching to a booster channel when the signal strength is detected to be below a predetermined level, said booster comprising:

a first transceiver (33) provided for communication with said mobile unit over said booster channel;

a second transceiver (37) provided for communication with said land site over a control channel;

a controller (40) coupled to said first and second transceivers; and relay means (30) coupled to said controller and selectively tunable to a desirable channel within a predetermined spectrum to establish communication between said mobile unit and said land site over said desirable channel;

wherein said controller controls said relay means to tune to said desirable channel according to data applied thereto from said mobile unit and/or said land site.

* * * * *